US007469494B2

(12) United States Patent
Katz et al.

(10) Patent No.: US 7,469,494 B2
(45) Date of Patent: Dec. 30, 2008

(54) READING ASSISTANT FOR TORAH SCROLLS

(75) Inventors: Dov Katz, 12 Harrison Ave., Apt. #2B, Brooklyn, NY (US) 11211; Bezalel Katz, 12 Harrison Ave., Apt. #2B, Brooklyn, NY (US) 11211; Max Moskowitz, Kew Gardens Hills, NY (US)

(73) Assignees: Dov Katz, Brooklyn, NY (US); Bezalel Katz, Brooklyn, NY (US)

( * ) Notice: Subject to any disclaimer, the term of this patent is extended or adjusted under 35 U.S.C. 154(b) by 165 days.

(21) Appl. No.: 11/357,247

(22) Filed: Feb. 17, 2006

(65) Prior Publication Data

US 2007/0195514 A1 Aug. 23, 2007

(51) Int. Cl.
*G02B 27/02* (2006.01)

(52) U.S. Cl. .............................. 40/367; 345/9; 345/2.1; 345/30

(58) Field of Classification Search ................... 40/367; 381/483.1; 353/61, 38, 122
See application file for complete search history.

(56) References Cited

U.S. PATENT DOCUMENTS

| | | | | |
|---|---|---|---|---|
| 4,156,561 | A | | 5/1979 | Lucas |
| 4,565,430 | A | | 1/1986 | Grunwald |
| 4,795,252 | A | | 1/1989 | Kyhl |
| 5,073,023 | A | * | 12/1991 | Arsem ......................... 353/42 |
| 5,620,245 | A | * | 4/1997 | Kobayashi et al. ............ 353/28 |
| 6,581,869 | B2 | * | 6/2003 | Arrane .................... 242/538.2 |
| 7,236,144 | B2 | * | 6/2007 | Ari .............................. 345/9 |
| 2002/0096037 | A1 | | 7/2002 | Muller |
| 2004/0257301 | A1 | | 12/2004 | Ari |

* cited by examiner

*Primary Examiner*—Joanne Silbermann
*Assistant Examiner*—Shin Kim
(74) *Attorney, Agent, or Firm*—Ostrolenk, Faber, Gerb & Soffen, LLP

(57) ABSTRACT

A system and method for reading Torah text, which includes a light table on which notation sheets which are in the form of individual sheets or a scrollable web are placeable, is so structured that a Torah scroll can be opened by being placed over the light table and the notation sheet and the Torah text can be aligned with the notation sheet to allow a Cantor or a Rabbi to read to a congregation the text of the Torah with the proper cantilations and pronunciations by observing the notation marks as they are visible by their being projected through the parchment of the Torah.

17 Claims, 10 Drawing Sheets

Common tropes — 201a — Symbol

201. Mercha tipcha
202. Munach etnachta
203. Sof pasuk
204. Mapach pashta
205. Munach zakef-katon
206. R'vi-ee, munach l'garmei
207. Kadma v'azla
208. Darga t'vir Less common tropes 209. Y'tiv — up high
210. Gershayim
211. Zarka, segol
212. T'lisha k'tana
213. T'lisha g'dola
214. Pazer
215. Zakef-gadol
216. Shalshelet (very rare)
217. Karnei Parah
218. Yareach ben Yomo
219. Mercha Kefula

EXAMPLE

READING ASSISTANT FOR TORAH SCROLLS

BACKGROUND OF THE INVENTION

The present invention relates to transparencies and, more particularly, to an arrangement designed to facilitate the reading of Torah and similar scrolls during Jewish religious services.

The Torah scroll plays a central and virtually daily role in the lives of those who practice the ritualistic aspects of the Jewish faith. These scrolls contain the Hebrew text of the first five books of the Old Testament and selected portions of other Old Testament portions, e.g., the Prophets. In adherence to millennium old custom, the Hebrew text in these scrolls is presented in the form of adjacently placed columns of text, with a continuous stream of words, and no spacing between sentences or punctuations of any type.

Indeed, religious custom requires that the text be read to the assembled congregation utilizing correct word pronunciation, special musical vocalization, tonal and syllabic sound inflections and various pauses that are specified by vowels and a special notation system that is only available in separate copies of the Torah text, but is forbidden to be added to or to appear on the parchment of which the Holy Torah scrolls are made. Therefore, cantors, Rabbis, or lay people who are called upon to read from the Torah to the congregants, must spend a great deal of time preparing in advance the reading of the Torah, by memorizing these Torah reading vowels, symbols and notations. Aside from the extra effort, even the experienced Torah reader will suffer occasional lapses of memory and thus skip or misapply one or more notes or pauses, which is undesirable from the perspectives of religious requirements, professional pride and other considerations.

The problem is aggravated when a number of people congregate impromptu to conduct services and then discover that no one present is capable or ready to read the current portion of the Torah and one of the congregants is called upon to "wing it".

U.S. patent application publication no. U.S.2004/0257301 A1 describes a method and means for projecting signs onto printed matter, including Torah scrolls. U.S. patent application publication No. U.S.2002/0096037 A1 describes a system for teaching melodies, including in connection with the singing or chanting of religious or liturgical texts which form part of the services in a Jewish Synagogue or Temple. U.S. Pat. No. 6,581,869 describes an apparatus and method for facilitating scrolling of scrollable documents such as a Torah. The contents of the aforementioned U.S. patent publications and issued patent are incorporated by reference herein.

SUMMARY OF THE INVENTION

Accordingly, it is an object of the invention to provide a device or instrumentality that would ameliorate or solve the above mentioned drawbacks of the prior art, without violating any of the religious rules against providing any notes or adding any interlinations, or notational marks in or on the parchment on which the Torah text is written, or projecting symbols onto any of the written portion of the Torah text.

It is a further object of the invention to provide an instrument or system or method of the above type which is constructed and operable in such fashion that its use would be permitted on the Jewish Sabbath, for example, a device that does not require turning on and off electrical power and which is portable and placeable over or below the open text folios of the Torah scroll without leaning on or being supported by the parchment of the Scroll, its handles, etc., which is strictly forbidden.

The foregoing and other objects of the invention are realized by an notation device which is itself in the form of a long transparent sheet or web on which are provided the various notes and punctuation marks that assist the reader of the Torah text. The web can be provided in the form of a vertically oriented scroll. In contrast to the folios of the Torah which proceed one after the other horizontally from right to left, the folios of transparent scroll of the notation device are arranged to follow vertically. Thus any folio of the notation scroll can be selected and placed under or over the Torah text with the punctuations and notations perfectly aligned, so as to enable the Torah reader to properly and correctly read the Torah text with hardly a possibility of error and with much greater ease and facility.

In the case where the notation scroll is placed under the Torah parchment, it is placed above a light table which projects the notations through the parchment, in a manner that will more fully described. In the case where the parchment is placed over the Torah text, special measures are provided to assure that the notation scroll does not actually touch or rest upon the Torah parchment. The most preferred embodiment utilizes the light table and locates the notation web under the Torah parchment.

When the reading of a particular Torah folio (column) has ended, the reader needs to roll the Torah scroll and the notation device of the invention to match and align the next set of folios with one another, which entails hardly any delay or inconvenience.

It is important to prevent the notations on the transparent folio from blocking any of the Torah text, and therefore the written matter on the web of the notation scroll must be provided in a size and position that allows placement of the notations between the lines of the Torah text.

Many alternatives are available to accomplish the above-described objects. In one alternative, the transparent sheets may be placed alongside the Torah text without the web of the notation scroll overlying any of the Torah text. The experienced Torah reader, or even a lay person, can easily associate the notations located alongside the Torah folio with the text of the Torah folio and apply the proper notations based on their relative placement on the notation sheet (which in this case, need not be transparent).

In accordance with a further embodiment, the underlying or overlaid sheet may contain, instead of the traditional Torah reading notations—called Tropes—substitute color-coded notations which correspond to the conventional notations. Moreover, the color-coded notations or the traditional notations themselves can be rendered in transparent ink and placed even over the Torah text itself, which could be viewed and read through the transparent ink. The notations may include additional notations as, for example, the end of a sentence, the end of a reading portion, pronunciation keys, i.e., vowels—called Nekudos—etc.

As yet another alternative, notations which are typically provided in small symbols that are smaller than the letters of the Torah, may be provided in a size as large and larger than the letters of the Torah and in very bold lines and further provided directly under the letters of the Torah, such that with the help of a light table, they would be clearly visible from the topside of the Torah parchment.

In accordance with a further embodiment, a notation scroll is not utilized and, instead, a rigid and transparent board is supported directly under or over the Torah text and individual transparent sheets of notations are placed on the transparent, e.g., Lucite® board. The Lucite® board may be cut out over the locations of the Torah letters, providing direct viewing with no intermediate physical object of any kind, with the transparent board being located above the Torah parchment. Similarly, the transparent sheets of notations may be placed over the transparent Lucite® board and may also be appropriately cut out around the Torah letters and sentences. Where individual sheets of notations are provided, such sheets may include special marks that allow it to be aligned with the Torah words. Similarly, the Lucite® sheet may contain marks that allow it to be precisely aligned and raised above the parchment to avoid any contact with the parchment while being perfectly aligned with the text on the parchment.

Numerous further embodiments and features of the invention are described in the detailed description which follows below. Thus, other features and advantages of the present invention will become apparent from the following description of the invention which refers to the accompanying drawings.

DETAILED DESCRIPTION OF EMBODIMENTS OF THE INVENTION

Figure 1:
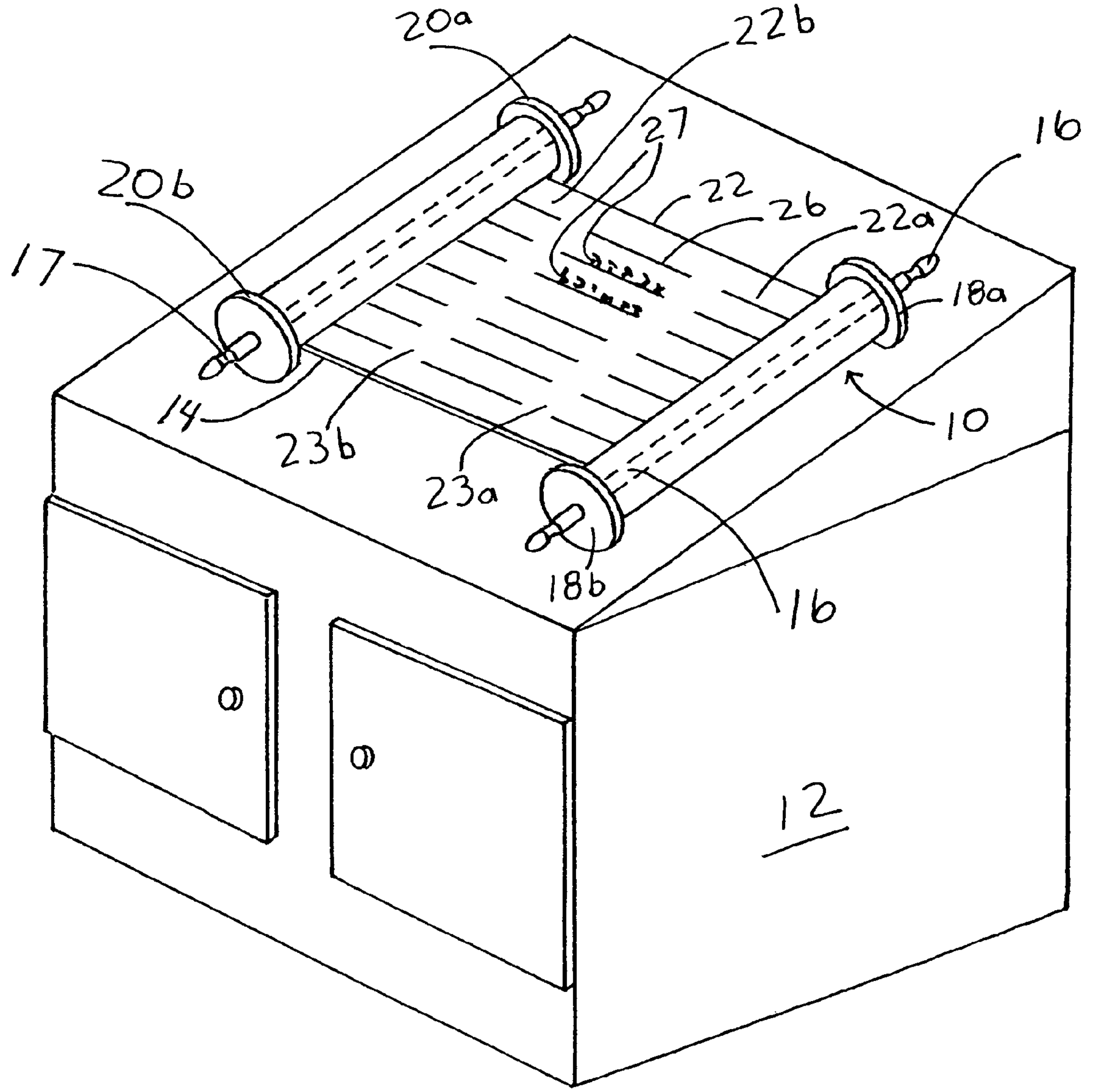
FIG. 1 PRIOR ART
FIG. 1 is a perspective of a prior art Torah scroll positioned on a Torah reading table.

FIG. 1 illustrates a prior art Torah scroll 10 perched atop a Torah scroll reading table 12, in an open position. As is conventional and highly uniform with a Torah or any type of Hebrew scroll, a very long web 14 made of parchment prepared from a Kosher animal's hide has its right side distal end fastened to an elongate right side handle 16 on which the parchment sheet 14 can be rolled up. The discs 18*a* and 18*b*, on the right side, are sufficiently large to allow the entire parchment to be rolled onto the right side, without protruding beyond the outer rim edges of the discs. Similarly, the left-hand handle 17 which protrudes on both the top and the bottom beyond the width of the parchment 14, passes through an upper disc 20*a* and a lower disc 20*b* which allow the entire parchment web to be rolled thereon, to reach the very beginning of the Torah text.

The Hebrew text appears in successively arranged columns of text 22, all of the same uniform width and height with lines of text 26, separated by interline spaces 27. The exposed column or folio of text 22 is flanked by a prior column 22*a* and a following column 22*b*, with inter-column margins 23*a*, 23*b* therebetween. The text consists of Hebrew letters which are aggregated into words but which are rendered with no separation or distinct spaces or any notation to indicate where sentences begin or end. Nor are there any vowels or punctuations or notations to indicate the vocalization or syllabic emphasis that is required to be applied by the reader of the Torah text, as he reads the text loudly and in musical tones to a congregation. The strict rules forbid adding any markings whatsoever on the parchment 14 which must not contain anything but the Holy text itself. Therefore, and as noted previously, reading a Torah to a congregation requires prior memorization of all of the notations and pauses and incantations and pronunciation keys that are required according to the custom and tradition of different of Jewish communities.

Figure 2:
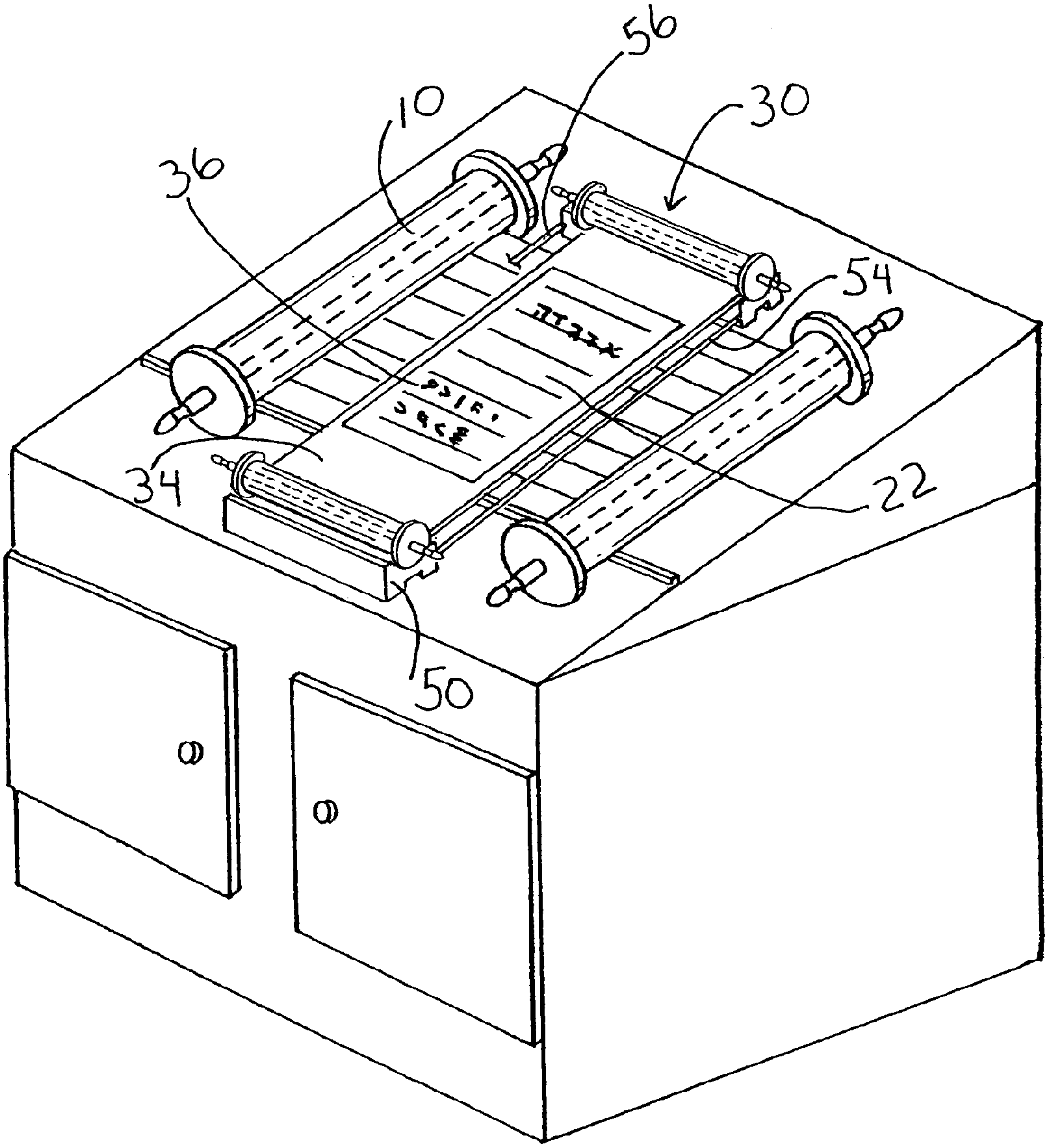
FIG. 2 is a perspective of an embodiment of the invention showing the open Torah scroll and the device that supports an overlaying transparent annotated sheet.

In accordance with an embodiment of the invention illustrated in FIG. 2, an auxiliary scroll 30 is supported on a substantially rectangular frame 50, in a manner which overlies the opened folio 22 of the Torah 10. More specifically, the auxiliary scroll 30 has a structure similar to that of the Torah 10, except that its rollable web 34 is constructed of very thin transparent material, for example, cellophane or the like, on which are imprinted various notations 36 which are separated, line-wise, with a spacing identical to the interline spacings on the Torah, in a manner whereby the notations 36 fit precisely between the lines of text of the Torah without obstructing any of the Torah text itself. The frame 50 comprises support bars 54, 56, 58 and 60 with the frame 50 containing the structure which is more specifically described in FIG. 3 which allows the auxiliary scroll to be turned to move successive pages or folios of notations to enable aligning the correct notations for the given Torah folio, while precisely aligning the notations between the lines of Torah text without touching the Torah parchment. The frame sides 54, 56 may be, however, positioned to press down the parchment, to maintain a small gap of a few millimeters between the parchment and the scroll web 34.

Figure 3:
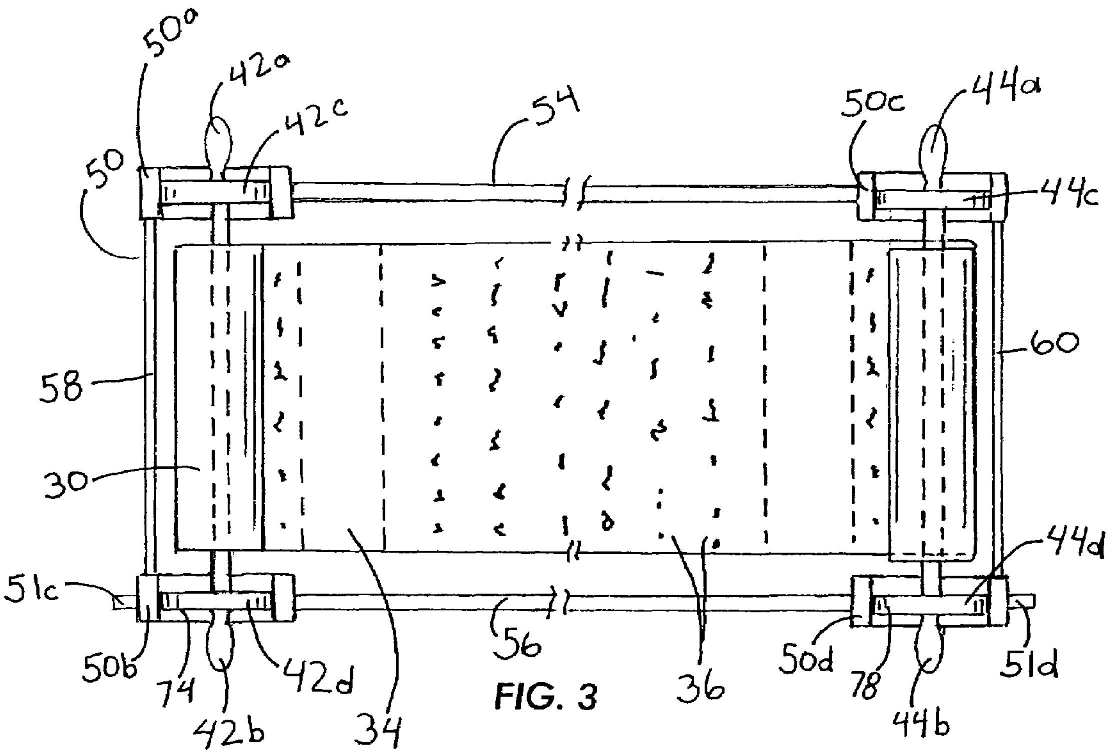
FIG. 3 is a diagrammatical view of an embodiment of the device of the present invention.

Referring to FIG. 3, there is provided a Torah reading assisting device in the form of the auxiliary scroll 30 in which pages or folios of information scroll vertically, rather than from right to left or left to right. Similar to the Torah scroll, the reading device 30 comprises upper handles 42*a*, 42*b* and lower handles 44*a*, 44*b*, each of which enables rolling thereon a long web of transparent, exceedingly thin sheet material which enables the web 34 to be maintained in a very taught state between the upper handles 42*a*, 42*b* and the lower handles 44*a*, 44*b*, without contacting the Torah parchment 14. As illustrated in FIG. 2, the reading device 30 is in a vertical orientation with one folio of its notations superimposed over a folio of Torah text. The notations on the transparent web of the reading device are extremely carefully aligned with the Torah text, so that the notations appear between the lines in the interline spaces 27, directly above or below the written text without blocking any of the text. Strict rules do not permit the Torah reader to recite the Torah text from memory, and the Torah text must therefore be fully visible.

Thus, when a reader approaches the table 12 to read sections of the Torah, he is able to actually see the notations, including various markings denoting sentence ends, pronunciation, etc. and correctly annunciate the various reading notations and musical vocalizations that are provided on the transparent sheet of the reading device 30.

Figure 3A:
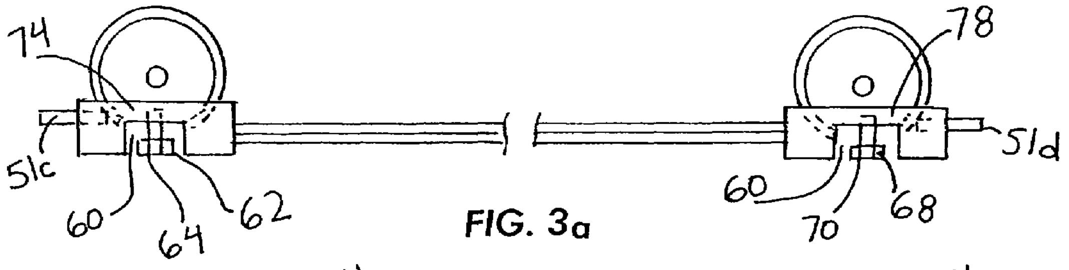
FIG. 3*a* is side view of FIG. 3, seen along lines 3*a*-3*a*.

Preferably, the upper and lower discs of the scroll are each positioned in the supporting structure 50, which allows the handles 42*a*, 42*b*, 44*a*, 44*b* to be turned in place within an arcuate grooves 74, 78 (FIG. 3*a*) without moving from their position, thereby maintaining very tightly the alignment with the text of the Torah. Preferably, the discs 42*c*, 42*d*, 44*c*, 44*d* of the scroll 30 can be fixed in one position without moving by tightening levers, e.g., 51*c*, 51*d*, or by the peripheral most radial edge surfaces being knarled. Still further, the supporting structure allows the height of the web 34 to be maintained a few millimeters above the parchment 14 of the Torah without touching it. To this end, the vertical position above the table of the web is adjustable through a height adjustment structure at each disc. This structure includes a recess 60 at the bottoms of the corner blocks 50*a*, 50*b*, 50*c*, 50*d* with a base 62, 68 and screws 64, 70 that can be turned to adjust the height of the bases 50*a*, 50*b*, 50*c*, 50*d*.

The lines of code or notations or musical notes 36 on the transparent sheet 34 can be in the form of the traditional notes—called Tropes—(shown in FIG. 10) which readers are accustomed to see and are familiar with. Alternatively, the device of the present invention can substitute for those notes highlighted marks rendered with transparent ink so they do not block any of the text underneath, even if the webs 14 and 34 are slightly misaligned. Still further, the invention contemplates that in lieu of the traditional notes, color markings would be provided where different colors denote different notes or indicate pauses, end of sentences, etc. If the notations are used under the parchment, they should be large, thick and of dark color to improve visibility through the parchment.

In accordance with a further embodiment of the invention, the width of the web is made extremely narrow so that it can fit in the inter-column margins 22*a*, 23*a* between Torah columns with various codes indicating the musical notes that are applicable to the text being positioned to the left (or to the right) of where the web is located.

Figure 4:
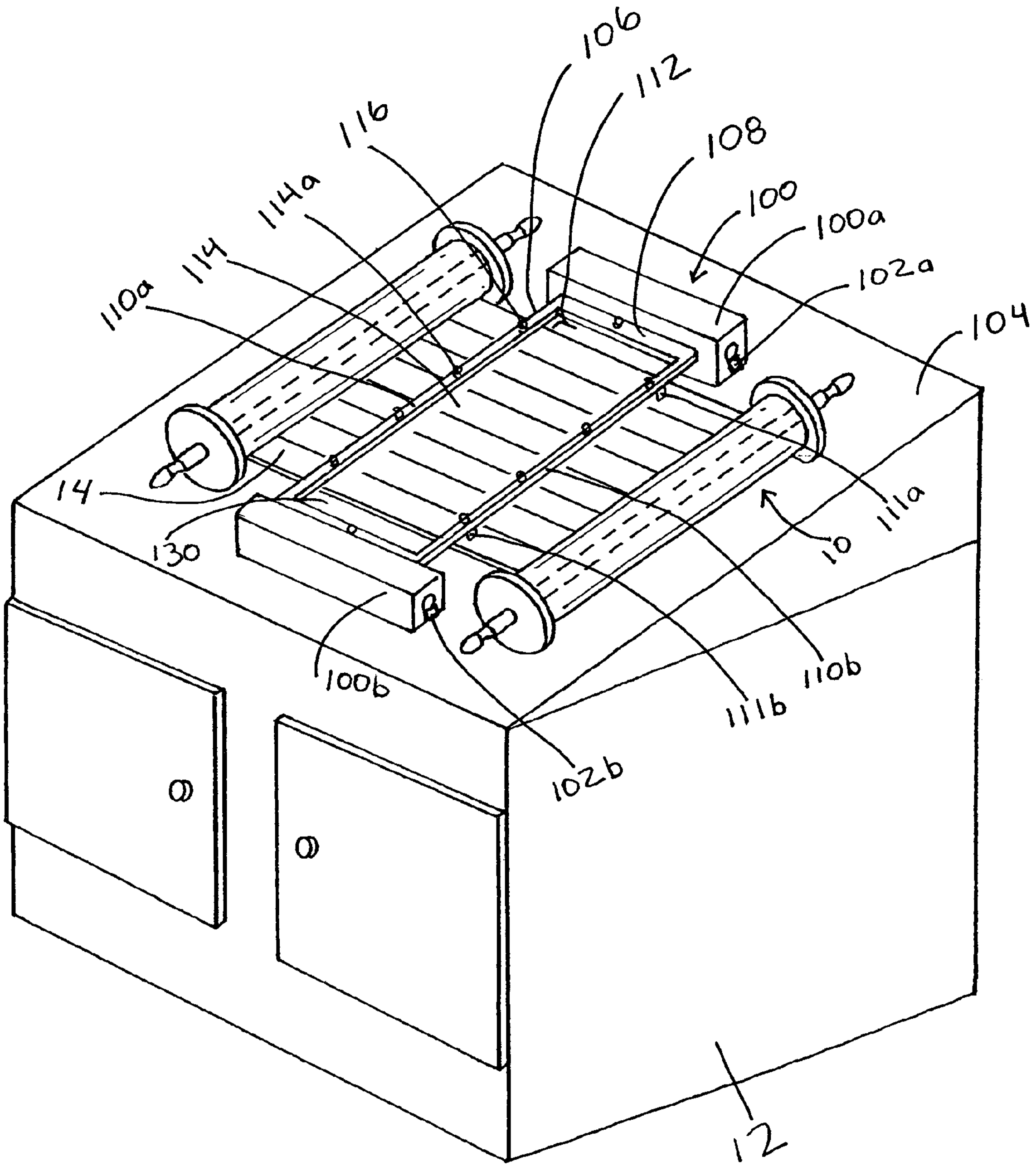
FIG. 4 is a perspective of a further embodiment of the present invention.
Figure 6:
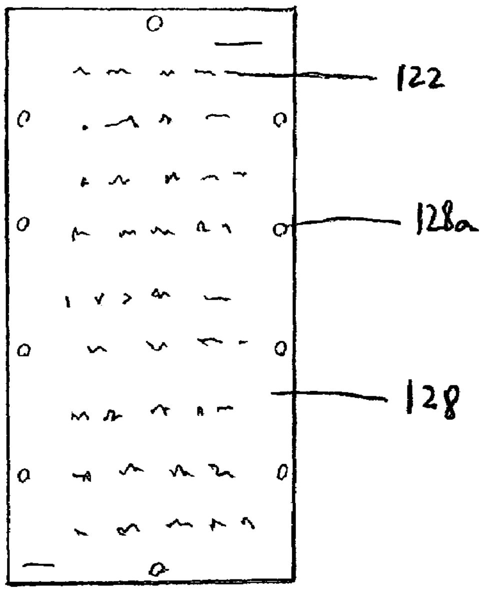
FIG. 6 shows a transparent page that is supported by the device of FIG. 5.

With reference to FIG. 4, an alternate embodiment of the invention does not utilize a scroll, but rather single folio sheets 128 (FIG. 6), which are placeable on a windowed notation sheet holder 100.

More specifically, the sheet holder 100 comprises an upper support 100*a*, a lower support 100*b*, which rest on the flat surface 104 of the Torah reading table 12, supporting therebetween a frame 106 with an upper support 108 and side supports 100*a* and 100*b*. The defined opening 114 has a surrounding edge 112 (partially shown) on which a glass or transparent board 130 is supported. The glass or window 130 may be flush with the surface of the side frame pieces 110*a*, 110*b* to enable a preprinted sheet 128 containing Torah notations to be placed thereon.

If desired, the sheet may have a plurality of through holes 128*a* which enable the sheet to be registered and immovably placed by engaging projections 114*a*. The height of the window over the Torah parchment 14 may be controlled by changing the vertical height of the blocks 100*a* and 100*b* through corresponding adjusting mechanisms 102*a* and 102*b*. For added protection, downwardly projecting tabs 111*a*, 111*b* (and corresponding ones on the other side) may bear against the parchment 14 to maintain a distance of a millimeter or several millimeters above the Torah parchment. The tabs 111*a* and 111*b* should engage the Torah only at the location between text folios, so as not to touch or scratch any of the Torah text.

Figure 7:
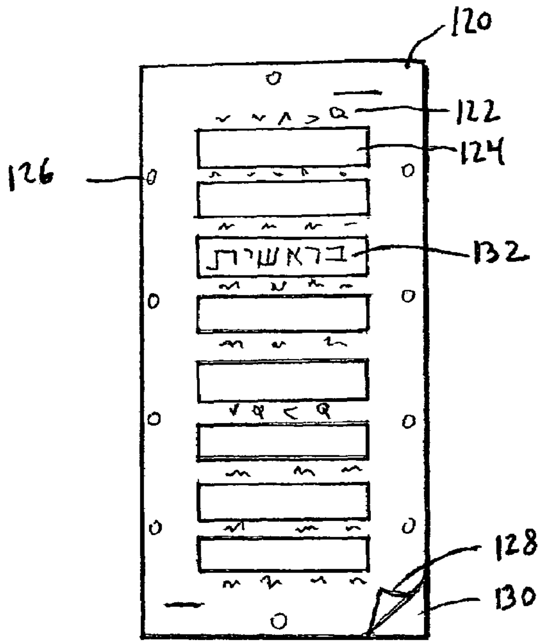
FIG. 7 shows a different variant of a notation page that can be supported on the device of FIG. 5.
Figure 5:
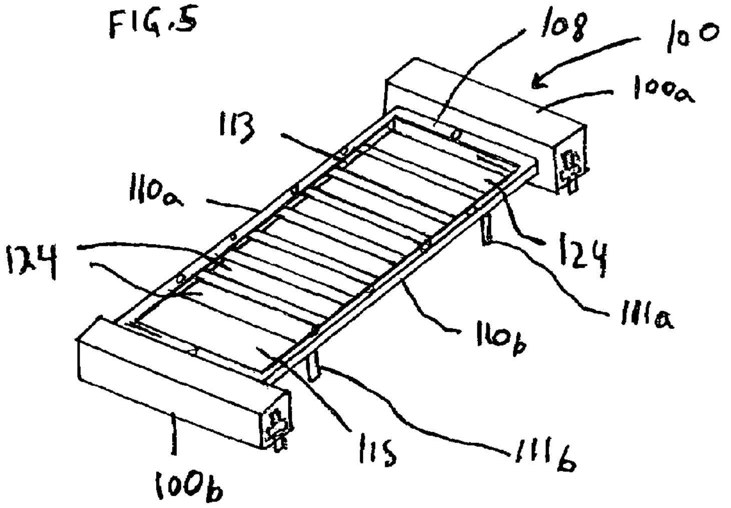
FIG. 5 illustrates details of FIG. 4.
Figure 8:
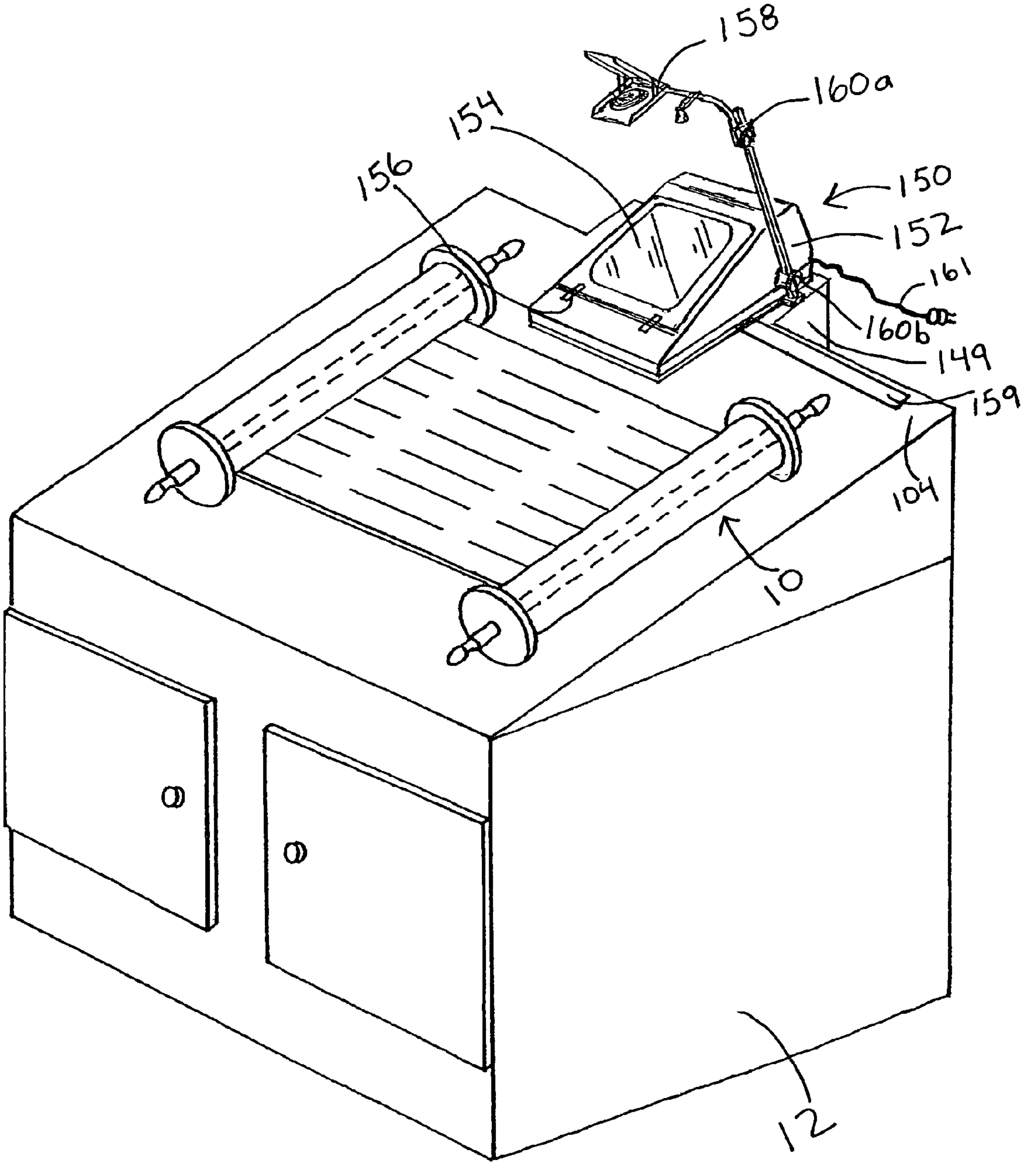
FIG. 8 shows a still further embodiment of the present invention which uses a projection system.

If desired, the window 114 of FIG. 4 can be rendered in the form of FIG. 5, wherein the window 115 is provided with pre-cut openings 124 which are intended to be registered with the Torah text directly underneath in a manner where the Torah text is not blocked, even by any glass or transparent material. For this embodiment, the notation sheet 128 will have corresponding cutouts, as shown in FIG. 7, with the notations 122 provided above (below) the cutouts to expose corresponding Torah text. For example, in FIG. 7, the Hebrew characters 132 are visible through the device 100 without any obstruction and without having any transparent sheet or the like superimposed over them. However, the devices 100 in FIGS. 4 and 5 can also utilize a sheet 128 that does not have the aforementioned cutouts.

In accordance with a further embodiment of the invention, no reading device as such which consists of a transparent sheet is provided. Rather, the invention is in the form of an electrical system including a projector 150 that is supported on the Torah table 12 or to a structure 149 that extends from the surface 104 of the table and has a base that supports the projector lens and light system 158 above the Torah text. The projector 150 remains turned on during an entire Torah reading session which allows a transparent notation sheet to be placed on the window 154, resting against the edge 156 to thereby project the notes that need to be applied to the open text. The adjusting mechanism 160*a*, 160*b* allow moving and aligning the notation with the text. When a reader has finished reading a particular folio, the next Torah folio is rolled into position and a next corresponding notation sheet is placed on the projector window 154, and so on. The projected notations may be actual Torah notes or they can consist of color codes that appear on the parchment on top of specific words or closely adjacent thereto. As before, in accordance with another alternative, the codes can appear in the spaces between folios of text that appear on the Torah scroll, or alongside.

The projector system 150 may be provided with an electrical cord 161 for providing electrical power and an internally embedded seven day timer, which turns on power automatically for those hours during the Sabbath when the Torah reading is to take place. During weekdays, an electrical switch may be used to turn the power on and off. The projector system can be provided with an internal battery system for powering the projector without resorting to power from the utility grid. The internal battery system may be coupled with a solar panel 159 which is always in a condition to receive ambient light and convert it into a trickle charge for the internal battery system.

Figure 9A:
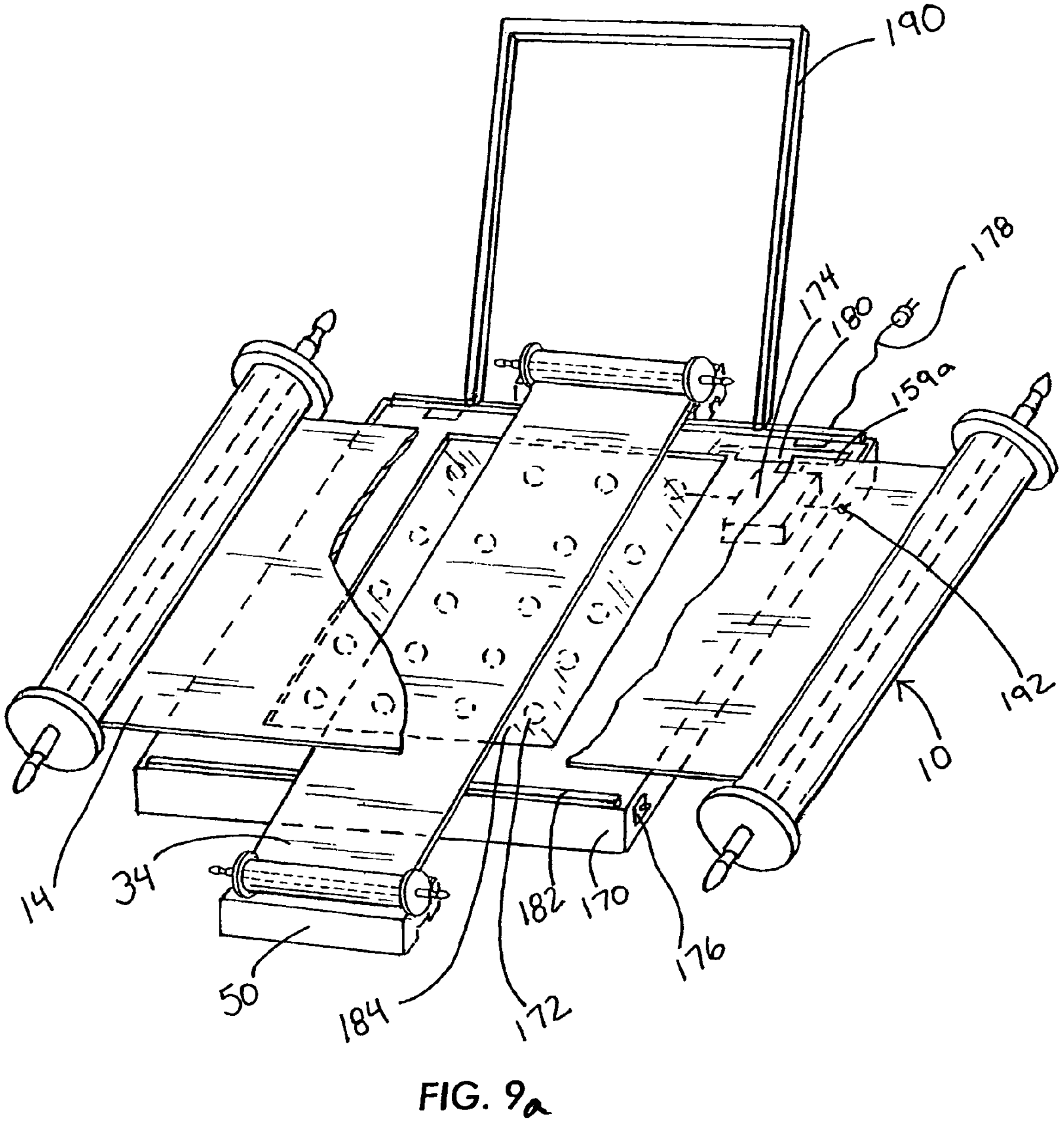
FIGS. 9*a*, 9*b* and 9*c* show yet other embodiments of the present invention which use a light table.

In accordance with yet another, most preferred, embodiment of the invention, which is illustrated in FIG. 9*a*, the previously described notation scroll or the stationary, windowed structure of FIGS. 4 and 5 may be provided in a location directly above a light table 170 which is connected to a power source via an electric cable 178. The light table may be turned on by means of a switch 176.

More specifically, the light table may have a generally rectangular or square body with a height and width to provide a lit window which is at least as large as a folio of Torah text. The interior of the light table 170 is provided with a plurality of lights or illuminators 172 which are closely packed to one another to provide a uniform light across a window opening 184. The lights 117 may of a circular shape, or long tubes of lights or the like. Preferably, the lighting is done by fluorescent devices rather than incandescent devices, in order not to produce any heat which might damage a Torah parchment.

In a typical application of this embodiment, the light table is placed on a Torah reading table of the aforementioned type with the scroll parchment 34 in an open position on the open window 184 with its takeup handles resting on the support structure blocks 50, as previously described. The Torah scroll is opened directly above and over the notation scroll such that the Torah parchment 14 is atop the notation scroll 34 in a position where the notations on the scroll 34 register with the Torah text on the parchment 14, as previously described. Here there is no issue of contact being made between the scroll parchment and the Torah parchment 14, since the scroll is located below the Torah. To assure intimate contact, a swingable bar system 190 can be swung to a closed position, pressing the Torah parchment 14 against the transparent scroll.

Figure 10:
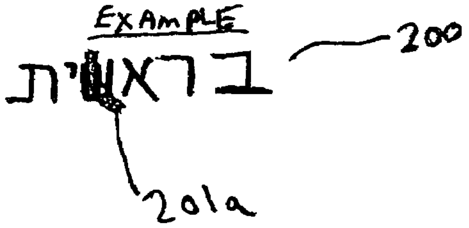
FIG. 10 is a table showing the typical reading notations, called Tropes, used by Torah readers to vocalize the Torah text.

When the light table is turned on, the various notation symbols on the scroll parchment 34 can be made visible in the interlying spaces between the lines of Torah text, as previously described. It is to be understood that the intensity of the light emanating from the light box should be strong enough to allow the symbols on the notation scroll 34 to be visible at the top of the parchment 14. This may not be simple to achieve, particularly when notation symbols are rendered in very small size and located only above or below the Torah letters. However, as already described, and particularly in the case of this embodiment, where the notations are located below the Torah, such that they do not block any of the Torah letters, it is possible to render those notes in a very large form with very dark and even colored notations so they would be visible above the parchment. For example, FIG. 10 shows a Tropes notation system, including various symbols 201-219 that are typically utilized. However, at the bottom of the Figure is shown a single Hebrew word 200 (which translates into "in the beginning"), which is atop and, therefore, not blocked by any notations, but which contains the silhouette 201 of the Torah notation "mercha" which symbol is quite visible to the reader, even though the symbol is quite large. Alternatively, various color symbols may be used. Torah letters or words may be encircled with different symbols to denote Tropes, or pronunciations, or delineations between Torah portions, etc. Still further, the symbol that may be used for a "mercha" or any other Trope may be a particular symbol which spans the entire word to make it even more visible at the top of the Torah parchment 14. The notation web or sheet may be designed to only include key tropes and vowels, such as those identified by numerals 203, 208, 210, 211, 212, 213 and 214 in FIG. 10 and vowels only where needed to indicate difficult to recall pronunciations. Indeed, notation sheets may be prepared with more or less detail to provide to or suit the needs of different Torah readers.

Figure 9B:
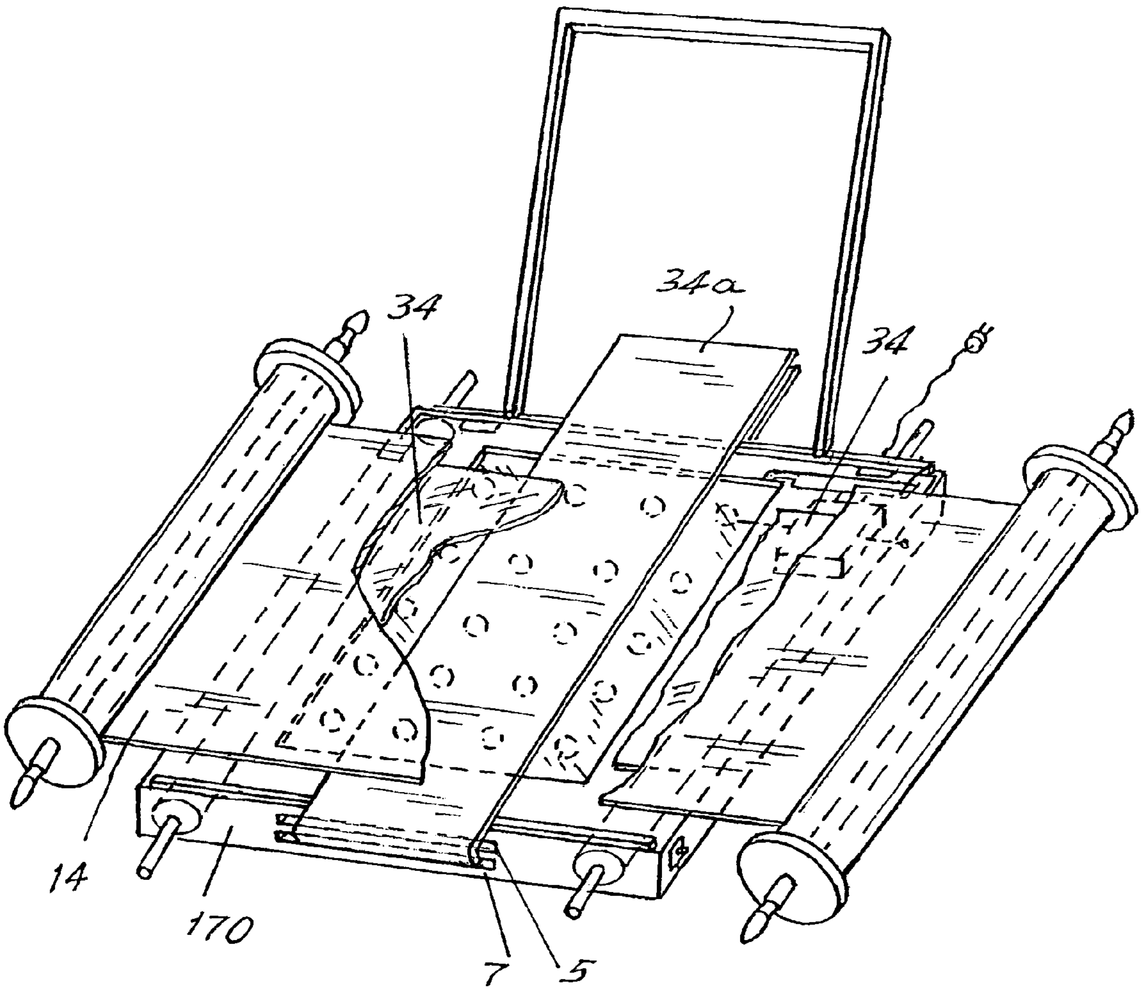

Preferably, the scroll or notation sheet holder may be integrated as a single housing, avoiding the need to handle the notation scroll separately from the light table. Also, the scroll may be integrated into the light table horizontally, as shown in FIG. 9*b*, with the notation web being scrolled directly under, in contact with the Torah parchment. The light table may be constructed to have superimposed glass or transparent panels, separated by the thickness of a sheet of notations placeable therebetween. The upper glass or transparent sheet should be on the order of one millimeter in thickness.

The Torah text is described in so-called "parshas", typically 5 to 8 folios (pages) long, each read on a corresponding Sabbath of the year. Therefore, it is advantageous to provide a plurality of notation webs, each of which contains only one parsha of Torah text, if desired, in stacked sheets 34*a*. As shown in FIG. 9*b*, the light table has an upper slot 5, through which the short parsha web 34*a* is slid between the two transparent panes, with the leading edge pushed into a lower tunnel 7 back into the light table, below the lights 172 on a return path. Thus, the Torah reader need only select the "web of the week" and align successive folios thereof with the Torah text as it is read.

Figure 9C:
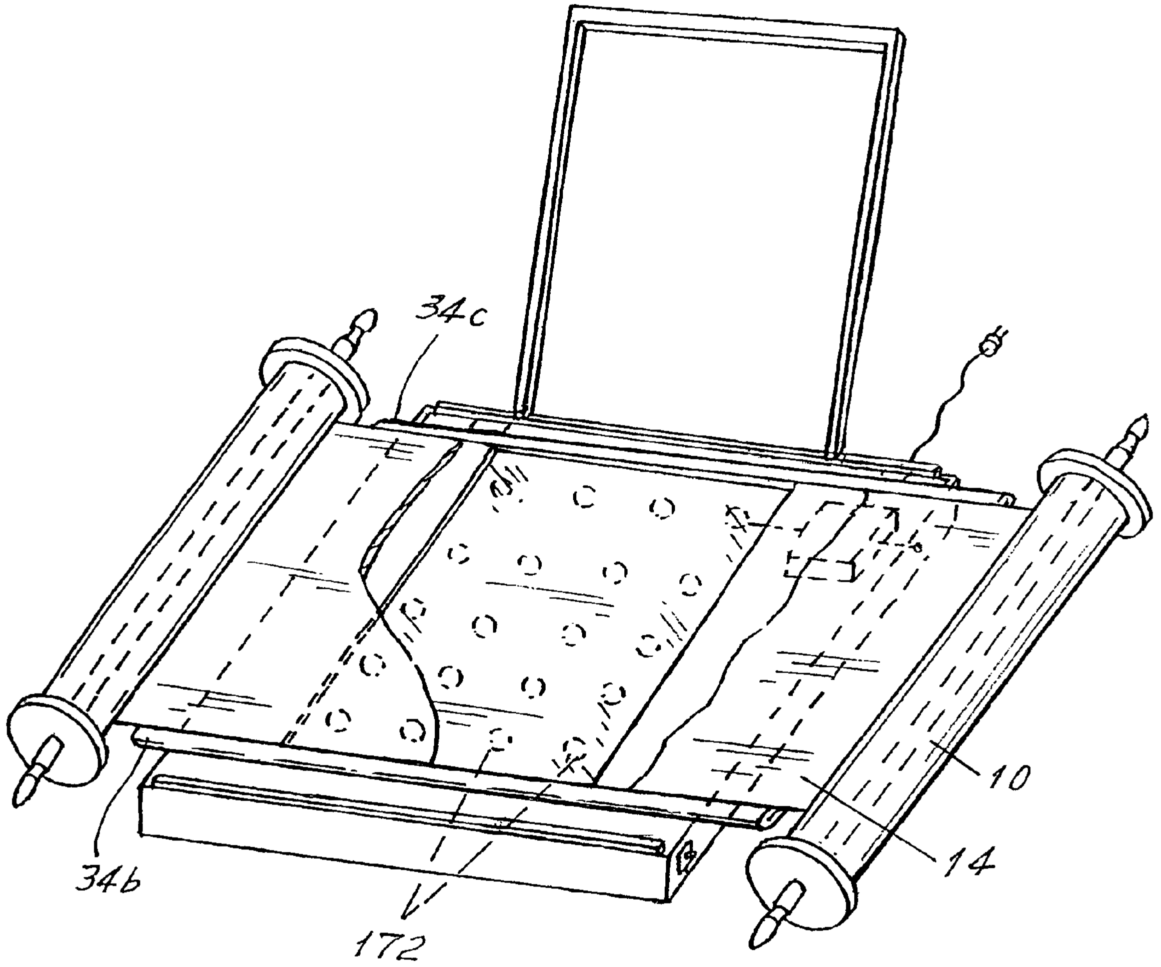

In accordance with FIG. 9*c*, "parsha" notation webs are aligned horizontally, each containing the notations for 6 to 8 Torah text folios. Each of these parsha sections can be placed on the back of the Torah parchment 14 with its upper and lower edges 34*c*, 34*b* folded over the parchment 14 and thereafter placed over the light table.

Figure 11A:
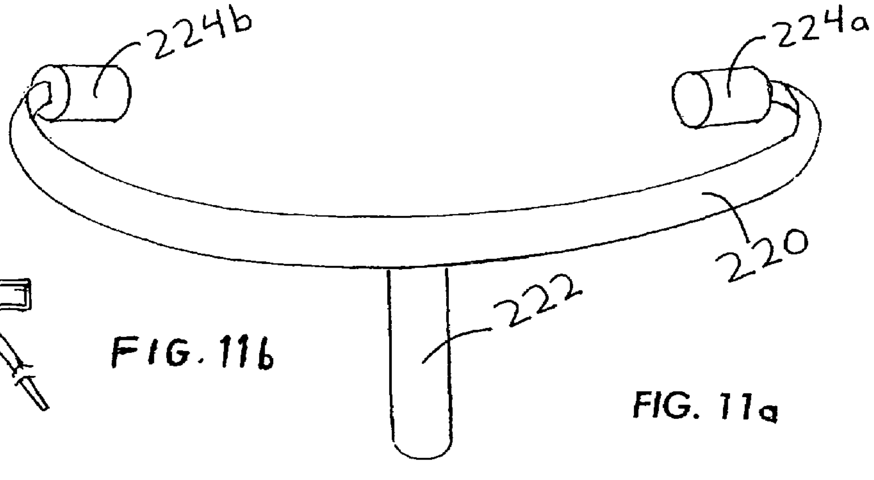
FIG. 11*a* shows a tool for pressing the parchment of a Torah.
Figure 11B:
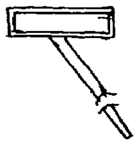
FIG. 11*b* shows a window defined by the tool of FIG. 11*a*.

For those who are experienced with Torah reading, it is known that readers of Torah sometimes utilize pointers with which they actually touch the parchment (away from the words). That tool may be used to press the parchment into closer contact with the underlying notation sheet. However, if desired, the invention shows in FIG. 11 a, a tool in the form of a yoke with a body 220 and a handle 222 and with rollers 224*a* and 224*b* which may be used to press down the Torah parchment on both the right and the left sides of folio text to improve the contact, if necessary. In FIG. 1 lb, the tool defines a window of several lines of text that can be pressed against the underlying notation sheet. In FIG. 9 (and all the other embodiments), an alignment bar 182 located either on the light table or on the Torah reading table can be used to align the bottom edge of the Torah parchment 14 in order to improve and facilitate the aligning of the notation marks with the Torah text.

The web of which the reading assistant is made may be comprised of a cellophane type material.

Since careful alignment of text is necessary in order to effectuate the scheme of the present invention, the invention further contemplates locating the Torah scroll on its own holder that allows precise positioning of each folio of text relative to the implements of the present invention, as shown in one of the incorporated by reference documents.

As noted at the outset, the invention is not limited to the reading of a Torah, but may be adapted for reading sections from the Prophets and from other scrolls, such as from the Scroll of Esther.

Also, it should be noted that while in the figures of the application the notation scroll or sheets are aligned vertically, it is equally easy to provide a scrolling device which is horizontally aligned with the scrolling direction of the Torah itself, i.e., from left to right or right to left.

In addition, note that the electrical control box 192 of the light table in FIG. 9 comprises circuitry and timers which will allow the lights to turn on at specified time periods to avoid the need to turn on or utilize the switch 176 on the Sabbath or Jewish holidays, which is forbidden. Moreover, a solar stripe 159*a* may be provided with the control box 192 (which has storage batteries) which serve to trickle charge the batteries, to avoid the need to utilize the power cord 178, when the Torah reading table is located in a Synagogue in a location which is away from any electrical socket or power source. Large capacity DC batteries may be located inside the Torah reading table 12, to provide power to the light table.

Moreover, preferably, the intensity of the lights is controllable in order to accommodate parchment of different thicknesses.

Lastly, it should be noted that marks provided by the present invention are not limited to cantilation notes, but may also include vowels that direct the reader how to correctly pronounce words and/or to other marks which indicate end of sentences or where reading portions for different individuals being called to the Torah begin and end.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for reading a religious Torah scroll made of a parchment on which unannotated text is provided, the method comprising the steps of:

providing a light table which has a window through which light emanates;

providing on the window of the light table a transparent notation sheet containing reading notations for the Torah text;

placing the parchment of the religious scroll over the notation sheet and aligning the notations on the notation sheet with the words and text of the Torah scroll, in a manner whereby the notations are visible through the parchment;

including applying a force to the parchment that presses down the parchment against the notation sheet; and chanting the Torah text to congregants by reading the actual words from the Torah scroll while applying various cantilations which are specified on the notation sheets.

2. The method of claim 1, including providing the notation sheet in the form of a scroll with various folios containing notations corresponding to folios of the Torah scroll and winding the notation sheet on a roller to align a folio of notations with a corresponding folio of Torah text.

3. The method of claim 1, including chanting the text by viewing notations which are in the form of symbols that have height dimensions that are comparable to a height dimension of letters which make up the text of the Torah scroll.

4. A reading system for facilitating the reading of a Torah scroll made of a parchment on which annotated text is printed, the reading system comprising:

a light table with a window through which light emanates in an intensity sufficient to penetrate through the scroll which is constructed of a parchment made of animal skin;

a web made of a transparent notation sheet containing reading notations for the Torah text; and a facility for supporting the transparent notation sheet on top of the light table, in a manner thereby when the parchment of the Torah scroll is placed on top of the notation sheet, the notation symbols on the sheet are visible at a front side of the Torah parchment on which annotated Hebrew text is located:

wherein the facility for supporting the notation sheet is integrated within the light table.

5. The reading system of claim 4, in which the facility for supporting the notation sheet comprises a scroll on which folios of notation are scrollable in a vertical direction relative to the Torah scroll which is scrollable horizontally.

6. The reading system of claim 4, wherein the facility for supporting the notation sheet comprises a scroll which is integrated into a housing of the light table and whereby the scroll of notations is windable horizontally and in the same directions as the Torah scroll.

7. The reading system of claim 4, wherein the lighting table comprises an electrical controller that enables light in the light table to turn on over a specified time period on specified days of the week and/or year.

8. The reading system of claim 4, including a battery power source for the light table.

9. The reading system of claim 8, farther comprising a solar panel for charging the battery power source.

10. The reading system of claim 8, wherein the battery power source of the light table is located within a table on which the light table is supportable and the battery power source is electrically coupled to the light table.

11. A reading system for facilitating the reading of a Torah scroll made of a parchment on which annotated text is printed, the reading system comprising:

a light table with a window through which light emanates in an intensity sufficient to penetrate through the scroll which is constructed of a parchment made of animal skin;

a web made of a transparent notation sheet containing reading notations for the Torah text; and a facility for supporting the transparent notation sheet on top of the light table, in a manner thereby when the parchment of the Torah scroll is placed on top of the notation sheet, the notation symbols on the sheet are visible at a front side of the Torah parchment on which annotated Hebrew text is located, further comprising a facility for pressing the Torah parchment against the notation sheet.

12. The reading system of claim 11, wherein the pressing device comprises a handheld pressing device.

13. The reading system of claim 4, wherein the notation sheet comprises a collection of notation sheets with various ones of the sheets containing notations that correspond to the text of a single Torah parsha.

14. The reading system of claim 4, wherein the light table comprises an internal channel for the passage of notation sheets through the channel.

15. The reading system of claim 14, wherein the channel is defined by an upper and a lower spaced transparent panels.

16. The reading system of claim 4, wherein the notations on the notation sheet are rendered in a size which is comparable to the size of corresponding letters of the Torah scroll.

17. The reading system of claim 4, wherein the symbols include color codes.

* * * * *